（12）United States Patent
Kim et al.

(10) Patent No.: US 11,272,217 B2
(45) Date of Patent: *Mar. 8, 2022

(54) METHOD OF DECODING MOVING PICTURES IN INTRA PREDICTION

(71) Applicant: IBEX PT HOLDINGS CO., LTD., Seoul (KR)

(72) Inventors: Kwangje Kim, Seoul (KR); Hyunoh Oh, Gwacheon-si (KR)

(73) Assignee: IBEX PT HOLDINGS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,146

(22) Filed: Jan. 29, 2021

(65) Prior Publication Data

US 2021/0152850 A1 May 20, 2021

Related U.S. Application Data

(63) Continuation of application No. 16/918,627, filed on Jul. 1, 2020, which is a continuation of application (Continued)

(30) Foreign Application Priority Data

Apr. 1, 2011 (KR) .................. 10-2011-0030294

(51) Int. Cl.
*H04N 19/82* (2014.01)
*H04N 19/159* (2014.01)
(Continued)

(52) U.S. Cl.
CPC .......... *H04N 19/82* (2014.11); *H04N 19/117* (2014.11); *H04N 19/159* (2014.11);
(Continued)

(58) Field of Classification Search
CPC .... H04N 19/82; H04N 19/159; H04N 19/117; H04N 19/182; H04N 19/593; H04N 19/176; H04N 19/11
(Continued)

(56) References Cited

U.S. PATENT DOCUMENTS 6,646,578 B1 * 11/2003 Au ..................... H03M 7/42
341/67
2004/0136458 A1 7/2004 Dahlhoff et al.
(Continued)

FOREIGN PATENT DOCUMENTS

CA 2763887 A1 1/2011
EP 2293567 A2 3/2011
(Continued)

OTHER PUBLICATIONS

Sjoberg et al., "Constrained Intra Souce Code Implementation", Joint Collaborative Team on Video Coding (JTC-VC) of ITU-T SG16 WP3 and ISO/IEC JTC1/SC29/WG11, JCTVC-D386, pp. 1-4, Jan. 20-28, 2011.
(Continued)

*Primary Examiner* — Tung T Vo
(74) *Attorney, Agent, or Firm* — Birch, Stewart, Kolasch & Birch, LLP

(57) ABSTRACT

A method for encoding an image includes determining an intra prediction mode of a current block; generating a prediction block of the current block according to the intra-prediction mode; generating a residual block by calculating a difference between the current block and the prediction block; transforming the residual block to generate a transform block; quantizing the transform block to generate a quantized block; and entropy-coding coefficients of the quantized block.

4 Claims, 5 Drawing Sheets

Related U.S. Application Data

No. 16/149,491, filed on Oct. 2, 2018, now Pat. No. 10,735,772, which is a continuation of application No. 15/699,455, filed on Sep. 8, 2017, now Pat. No. 10,142,658, which is a continuation of application No. 14/591,477, filed on Jan. 7, 2015, now Pat. No. 9,788,016, which is a continuation of application No. 13/743,161, filed on Jan. 16, 2013, now Pat. No. 9,445,127, which is a continuation of application No. PCT/KR2012/001923, filed on Mar. 16, 2012.

(51) Int. Cl.
*H04N 19/117* (2014.01)
*H04N 19/182* (2014.01)
*H04N 19/593* (2014.01)
*H04N 19/176* (2014.01)
*H04N 19/11* (2014.01)

(52) U.S. Cl.
CPC ......... *H04N 19/182* (2014.11); *H04N 19/593* (2014.11); *H04N 19/11* (2014.11); *H04N 19/176* (2014.11)

(58) Field of Classification Search
USPC .................................................. 375/240.12
See application file for complete search history.

(56) References Cited

U.S. PATENT DOCUMENTS

| | | |
|---|---|---|
| 2004/0247190 A1 | 12/2004 | Hagai et al. |
| 2004/0264576 A1 | 12/2004 | Woods et al. |
| 2005/0078755 A1 | 4/2005 | Woods et al. |
| 2005/0105617 A1 | 5/2005 | Chono |
| 2006/0072676 A1 | 4/2006 | Gomila |
| 2006/0193388 A1 | 8/2006 | Woods et al. |
| 2007/0003149 A1 | 1/2007 | Nagumo et al. |
| 2009/0028239 A1* | 1/2009 | Schuur ................ H04N 19/136 375/240.03 |
| 2009/0086814 A1* | 4/2009 | Leontaris ............... H04N 19/17 375/240.02 |
| 2009/0141798 A1 | 6/2009 | Adachi et al. |
| 2009/0304084 A1 | 12/2009 | Hallapuro et al. |
| 2010/0061454 A1 | 3/2010 | Park et al. |
| 2010/0080284 A1 | 4/2010 | Lee et al. |
| 2010/0284458 A1 | 11/2010 | Andersson et al. |
| 2010/0290527 A1 | 11/2010 | Park et al. |
| 2011/0026599 A1 | 2/2011 | Andersson et al. |
| 2011/0038415 A1 | 2/2011 | Min et al. |
| 2011/0200103 A1* | 8/2011 | Kim ....................... H04N 19/86 375/240.03 |
| 2011/0280304 A1 | 11/2011 | Jeon et al. |
| 2012/0027083 A1* | 2/2012 | Narroschke ......... H04N 19/117 375/240.03 |
| 2012/0063515 A1* | 3/2012 | Panchai ............... H04N 19/463 375/240.16 |
| 2012/0093426 A1 | 4/2012 | Sato |
| 2012/0189051 A1 | 7/2012 | Zheng et al. |
| 2012/0236929 A1 | 9/2012 | Liu |
| 2012/0287998 A1 | 11/2012 | Sato |
| 2013/0016780 A1 | 1/2013 | Oh |
| 2013/0028328 A1 | 1/2013 | Shiodera et al. |
| 2013/0077884 A1* | 3/2013 | Ikai ....................... H04N 19/86 382/233 |
| 2013/0089136 A1 | 4/2013 | Srinivasan et al. |
| 2013/0089144 A1 | 4/2013 | Lee |
| 2013/0114707 A1 | 5/2013 | Seregin et al. |
| 2013/0177079 A1 | 7/2013 | Kim et al. |
| 2013/0272623 A1 | 10/2013 | Jeon et al. |
| 2013/0294511 A1 | 11/2013 | Sjoberg et al. |
| 2013/0329794 A1 | 12/2013 | Jeon et al. |
| 2014/0328397 A1 | 11/2014 | Jeon et al. |

FOREIGN PATENT DOCUMENTS

| | | |
|---|---|---|
| EP | 2600614 A2 | 6/2013 |
| JP | 2010-232734 A | 10/2010 |
| KR | 10-2010-0132973 A | 12/2010 |
| KR | 10-2011-0018189 A | 2/2011 |
| KR | 10-2012-0012401 A | 2/2012 |

OTHER PUBLICATIONS

Wahadaniah, "Constrained Intra Prediction Scheme for Flexible-Sized Prediction Units in HEVC", Joint Collaborative Team on Video Coding (JTC-VC) of ITU-T SG16 WP3 and ISO/IEC JTC1/SC29/WG11, JCTVC-D094, pp. 1-8, Jan. 20-28, 2011.

Wiegand, "WD3: Working Draft 3 of High-Efficiency Video Coding", Joint Collaborative Team on Video Coding (JTC-VC) of ITU-T SG16 WP3 and ISO/IEC JTC1/SC29/WG11, JCTVC-E603, pp. 1-215, Mar. 16-23, 2011.

Winken et al., "Description of video coding technology proposal by Fraunhofer HHI", Joint Collaborative Team on Video Coding (JTC-VC) of ITU-T SG16 WP3 and ISO/IEC JTC1/SC29/WG11, JCTVC-A116, pp. 1-44, Apr. 15-23, 2010.

* cited by examiner

METHOD OF DECODING MOVING PICTURES IN INTRA PREDICTION

CROSS-REFERENCE TO RELATED APPLICATIONS

This application is a Continuation of co-pending U.S. patent application Ser. No. 16/918,627 filed on Jul. 1, 2020, which is a Continuation of U.S. patent application Ser. No. 16/149,491 filed on Oct. 2, 2018 (now U.S. Pat. No. 10,735,772 issued on Aug. 4, 2020), which is a Continuation of U.S. patent application Ser. No. 15/699,455 filed on Sep. 8, 2017 (now U.S. Pat. No. 10,142,658 issued on Nov. 27, 2018), which is a Continuation of U.S. patent application Ser. No. 14/591,477 filed on Jan. 7, 2015 (now U.S. Pat. No. 9,788,016 issued on Oct. 10, 2017), which is a Continuation of U.S. patent application Ser. No. 13/743,161 filed on Jan. 16, 2013 (now U.S. Pat. No. 9,445,127 issued on Sep. 13, 2016), which is a Continuation of PCT International Application No. PCT/KR2012/001923 filed on Mar. 16, 2012, which claims the priority benefit under 35 U.S.C. § 119(a) to Korean Patent Application No. 10-2011-0030294 filed in the Republic of Korea on Apr. 1, 2011, all of which are hereby expressly incorporated by reference into the present application.

BACKGROUND OF THE INVENTION

Field of the Invention

The present invention relates to a method for decoding moving pictures in intra prediction mode, and more particularly, to the method for generating a prediction block similar to an original image by adaptively generating and filtering reference pixels of a current block.

Discussion of the Related Art

Many digital video compression techniques have been proposed to efficiently transmit a video signal at a low data rate with high video quality. The video compression techniques include H.261, Moving Picture Experts Group-2/H.262 (MPEG-2/H.262), H.263, MPEG-4, Advanced Video Coding/H.264 (AVC/H.264), etc. These compression techniques involve Discrete Cosine Transform (DCT), Motion Compensation (MC), quantization, entropy coding, etc.

To keep high video quality, a large amount of data is taken for video coding. However, an available data rate for transmitting coded data is limited because of a limited allowed bandwidth for video data transmission. For example, a data channel of a satellite broadcasting system or a data channel of a digital cable TV network transmits data typically at a Constant Bit Rate (CBR).

In this context, video coding schemes have been proposed to achieve high video quality, while minimizing implementation complexity and a transmission data rate.

For example, the H.264/AVC standard offers intra-prediction coding in a spatial area using adjacent pixels. Determining adjacent pixels to be used is important to improvement of coding efficiency. For this purpose, the optimum direction to be used for the intra-prediction is determined and a predicted value of a pixel to be encoded is calculated using adjacent pixels corresponding to the optimum direction.

However, as prediction blocks are increased diversified in size, a plurality of adjacent reference blocks are highly likely to exist for a current block. In this case, a difference of pixel values may be generated between reference pixels at both boundaries of the reference blocks. If intra-prediction is performed using the reference pixels, residual blocks obtained after the generation of prediction blocks may contain many high-frequency components. As a consequence, coding efficiency is decreased.

SUMMARY OF THE INVENTION

An object of the present invention is to provide a method for reconstructing an intra-prediction block similar to an original image. Furthermore, the object of the present invention is to provide a method for reducing the amount of data and improving a video quality by minimizing the amount of data of a residual signal when a block encoded in intra-prediction mode is reconstructed.

The object of the present invention can be achieved by providing a method for decoding moving pictures in intra prediction, the method comprising: reconstructing the intra-prediction mode of a current block; generating a reference pixel using an available reference pixel when there is an unavailable reference pixel for the current block; adaptively filtering the reference pixel of the current block based on the reconstructed intra-prediction mode and a size of the current block; and generating a prediction block of the current block using the intra-prediction mode of the current block and reference pixel corresponding to the intra-prediction mode, wherein, in the generating step of the reference pixel, the unavailable reference pixel is set as a pixel value of the available reference pixel, the available reference pixel being an available pixel on the nearest position in a predetermined direction from the unavailable reference pixel.

And, in accordance with the present invention, when there is not the available reference pixel positioned in the predetermined direction from the unavailable reference pixel, the unavailable reference pixel is set as a pixel value of the available reference pixel on the nearest position in the opposite direction.

Furthermore, in accordance with the present invention, as a size of a current block is increased, the number of the intra-prediction mode for filtering a reference pixel may be equal to or increased.

According to the present invention, there are advantages in that a prediction block similar to an original image is obtained by generating an unavailable reference pixel from an available reference pixel and generating the prediction block after the reference pixel is adaptively filtered based on a size and intra-prediction mode of a current block. Furthermore, not only the compression performance of the moving pictures can be improved, but also the encoding and decoding efficiency can be maximized, by generating a prediction block similar to an original block and minimizing an amount of data of a residual signal.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE EMBODIMENTS

Reference will now be made in detail to embodiments of the present invention, examples of which are illustrated in the accompanying drawings. Since there can be a variety of alterations and embodiments of the present invention, certain embodiments will be illustrated and described with reference to the accompanying drawings. This, however, is by no means to restrict the present invention to certain embodiments, and shall be construed as including all alterations, equivalents and substitutes covered by the spirit and scope of the present invention.

Figure 1:
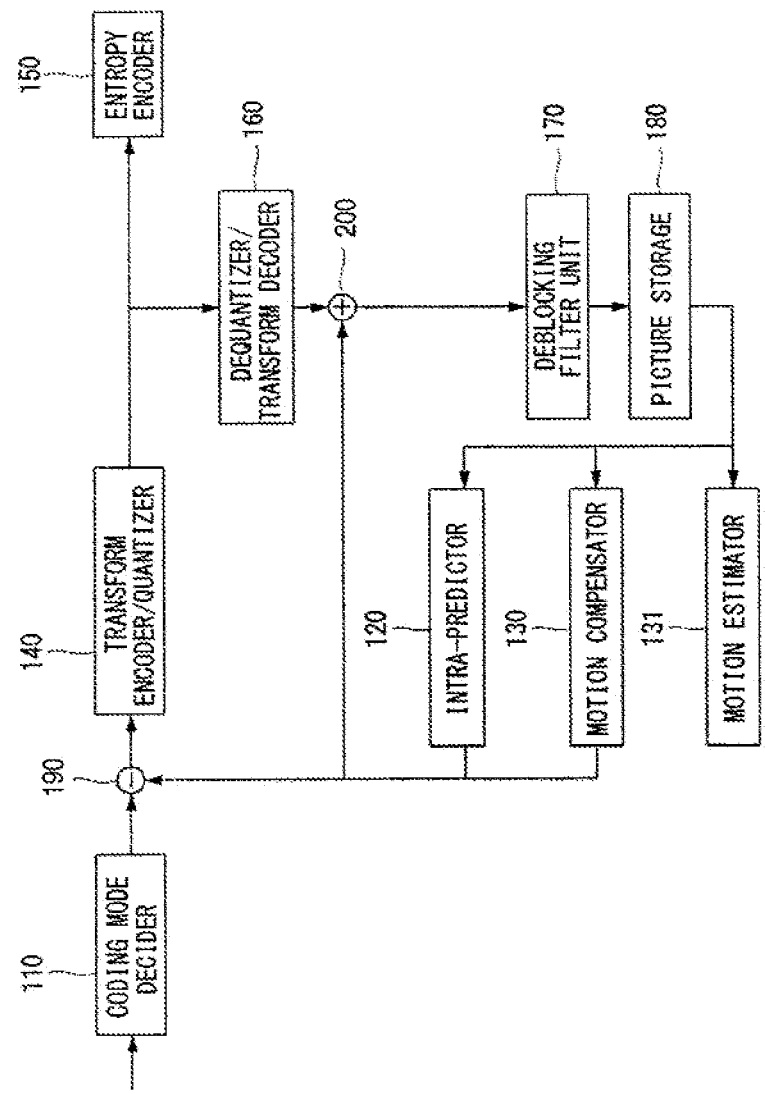
FIG. 1 is a block diagram of a video encoder according to an embodiment of the present invention.

FIG. 1 is a block diagram of a video encoder according to an embodiment of the present invention.

Referring to FIG. 1, the video encoder includes a coding mode decider 110, an intra-predictor 120, a motion compensator 130, a motion estimator 131, a transform encoder/quantizer 140, an entropy encoder 150, a dequantizer/transform decoder 160, a deblocking filter 170, a picture storage 180, a subtractor 190, and an adder 200.

The coding mode decider 110 partitions a picture into coding blocks each having a predetermined size by analyzing an input video signal and determines a coding mode for the coding blocks. The coding mode includes an intra-prediction coding and an inter-prediction coding.

A picture is comprised of a plurality of slices, each slice including a plurality of Largest Coding Units (LCUs). An LCU may be partitioned into a plurality of Coding Units (CUs). An encoder may add a flag indicating whether it is partitioned or not to a bit stream and a decoder may determine the position of an LCU using an address, LcuAddr. If division is not allowed, a CU is considered to be a Prediction Unit (PU) and the decoder may determine the position of a PU using a PU index.

A PU may be divided into a plurality of partitions. In addition, the PU may include a plurality of Transform Units (TUs).

The coding mode decider 110 transmits the video data in block unit, for example, PU or TU, each block unit having the predetermined size according to the determined coding mode, to the subtractor 190.

The transform encoder/quantizer 140 transforms a residual block calculated by the subtractor 190 from the spatial domain to the frequency domain. For example, the transform encoder/quantizer 140 performs two-dimensional Discrete Cosine Transform (DCT) or Discrete Sine Transform (DST) on the residual block. Further, the transform encoder/quantizer 140 determines a quantization step size and quantizes transform coefficients using the determined quantization step size. A quantization matrix may be determined according to the determined quantization step size and coding mode.

The quantized two-dimensional transform coefficients are transformed to one-dimensional transform coefficients by one of predetermined scanning methods. A sequence of one-dimensional transform coefficients is provided to the entropy encoder 150.

The dequantizer/transform decoder 160 dequantizes the quantized coefficients received from the transform encoder/quantizer 140 and inversely transforms the dequantized coefficients, thereby reconstructing the frequency-domain residual block to the spatial-domain residual block.

The deblocking filter 170 performs filtering on the dequantized and inversely transformed video data received from the dequantizer/transform decoder 160 in order to remove blocking effects.

The picture storage 180 reconstructs a video in picture unit from the filtered video data received from the deblocking filter 170 and stores the reconstructed video. A picture may be an image in a frame or field. The picture storage 180 includes a buffer (not shown) for storing a plurality of pictures. The plurality of pictures stored in the buffer are provided for intra-prediction and motion estimation. These pictures are referred to as reference pictures.

The motion estimator 131 receives at least one reference picture from the picture storage 180, performs motion estimation using the at least one reference picture, and outputs motion data including a motion vector, an index indicating the reference picture, and block mode.

To optimize prediction accuracy, the motion vector is determined with a fractional-pixel accuracy, for example, a ½ or ¼ pixel accuracy. Because the motion vector may be calculated to a fractional-pixel accuracy, the motion compensator 130 calculates a pixel value at a fractional pixel position from a pixel value at an integer pixel position by applying an interpolation filter for calculating a pixel value at a fractional pixel position to the reference picture.

The motion compensator 130 extracts a prediction block matching to a block to be encoded from the reference picture used for motion estimation among the plurality of reference pictures stored in the picture storage 180, according to the motion data received from the motion estimator 131.

The motion compensator 130 determines the filter characteristics of an adaptive interpolation filter needed for factional-accuracy motion compensation. The filter characteristics include information indicating a filter type and filter size of the adaptive interpolation filter, etc. The filter size may be represented, for example, as the number of taps, i.e. the number of filter coefficients of the adaptive interpolation filter.

Specifically, the motion compensator 130 may select a separable or non-separable adaptive interpolation filter and then determine the number of taps for the selected adaptive interpolation filter and each filter coefficient. A value of the filter coefficient may be determined differently based on a fractional pixel position relative to an integer pixel position. In addition, the motion compensator 130 may use a plurality of non-adaptive interpolation filters with fixed filter coefficients.

The motion compensator 130 may set the characteristics of the interpolation filter for each predetermined processing unit such as a fractional pixel, a basic coding unit (CU), a slice, a picture, or a sequence. The motion compensator 130 may set one characteristic for one video data. Since the same filter characteristic is kept within the same predetermined processing unit, the motion compensator 130 includes a memory for temporarily maintaining the filter characteristic. The memory preserves a filter characteristic and a filter coefficient, when needed. For example, the motion compensator 130 may determine a filter characteristic for each I picture and a filter coefficient for each slice.

The motion compensator 130 receives the reference picture from the picture storage 180 and generates a predicted reference picture with a fractional-pixel accuracy by filtering the reference picture using the determined adaptive interpolation filter.

Then, the motion compensator 130 generates a prediction block by performing motion compensation with a fractional-pixel accuracy based on the predicted reference picture and the motion vector determined by the motion estimator 131.

In case of prediction coding between pictures, the subtractor 190 receives a block of the reference picture matching to an input block to be encoded, calculates a difference between the block of the reference picture and the input block, and outputs the difference as a residual signal.

The intra-predictor 120 performs intra-prediction coding using the reconfigured pixel values within a prediction picture. The intra-predictor 120 receives a current block for prediction coding, selects one of a plurality of intra-prediction modes according to a size of the current block, and performs intra-prediction on the current block in the selected intra-prediction mode. The intra-predictor 120 determines the intra-prediction mode for the current block using previously encoded pixels adjacent to the current block and generates a prediction block corresponding to the determined mode.

A previously encoded area of the current picture is decoded and stored in the picture storage 180 for future use in the intra-predictor 120. The intra-predictor 120 generates a prediction block of the current block using adjacent pixels to the current block or available non-adjacent pixels within the previously encoded area of the current picture stored in the picture storage 180.

To predict an intra-block, the intra-predictor 120 may filter adjacent pixels adaptively. The video encoder may transmit information indicating whether filtering is performed to a video decoder so that the video decoder may perform the same operation. Or whether filtering is performed may be determined based on the intra-prediction mode and size of the current block.

A prediction type used in the video encoder depends on whether an input block is encoded in an intra mode or an inter mode, by the coding mode decider 110.

An intra/inter switch controls switching between the intra mode and the inter mode.

The entropy encoder 150 entropy-encodes the quantized coefficients received from the transform encoder/quantizer 140 and the motion information generated from the motion estimator 131. In addition, the entropy encoder 150 may encode intra-prediction mode, control data (e.g., a quantization step size, etc.). The entropy encoder 150 further encodes filter coefficients determined by the motion compensator 130 and outputs the coded filter coefficients in a bit stream.

Figure 2:
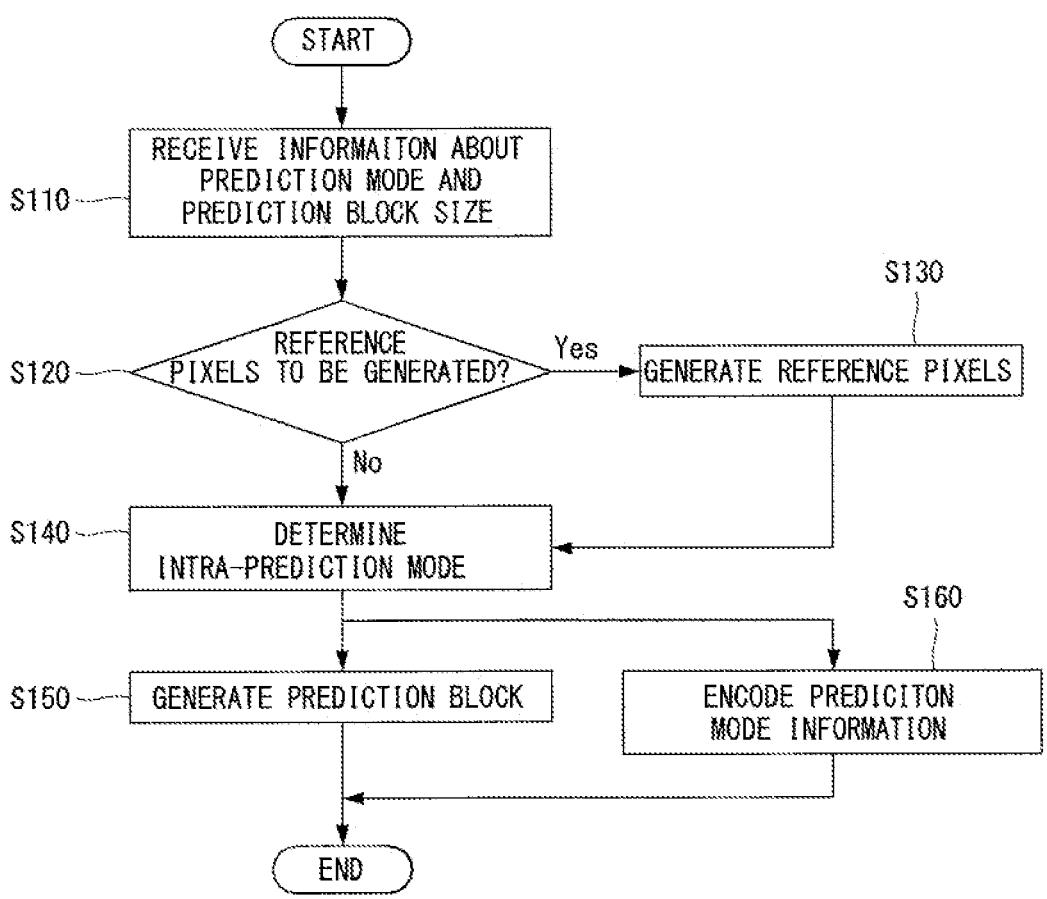
FIG. 2 is a flowchart illustrating an operation of an intra-predictor according to an embodiment of the present invention.

FIG. 2 is a flowchart illustrating an operation of the intra-predictor 120 according to an embodiment of the present invention.

Referring to FIG. 2, the intra-predictor 120 receives prediction mode information and size information of a prediction block from the coding mode decider 110 (S110). The prediction mode information indicates an intra mode. The prediction block may be a square of 64×64, 32×32, 16×16, 8×8 or 4×4 pixels, to which the present invention is not limited. That is, the prediction block may be shaped into a form other than a square.

Then, the intra-predictor 120 reads a reference pixel from the picture storage 180 in order to determine an intra-prediction mode of the prediction block. The intra-predictor 120 determines whether to generate the reference pixel by checking whether there is an unavailable reference pixel (S120). The reference pixels are used in determining the intra-prediction mode of the current block.

If the current block is positioned at an upper boundary of the current picture, there are no adjacent pixels above the current block. If the current block is positioned at a left boundary of the current picture, there are no adjacent pixels to the left of the current block. These pixels are determined as unavailable pixels. If the current block is positioned at a boundary of a slice, adjacent pixels above or to the left of the slice are determined as the unavailable pixels unless they are previously encoded and reconstructed.

In the absence of left or upper adjacent pixels to the current block or in the absence of previously encoded and reconstructed pixels, the intra-prediction mode of the current block may be determined using only the available pixels.

On the other hand, the reference pixels positioned in an unavailable area may be generated using the available reference pixels of the current block (S130). For example, if the pixels of an upper block are not available, the upper pixels may be generated using the whole or a part of left pixels, or vice versa. In other words, a reference pixel may generated by copying an available pixel, the available pixel indicating a pixel nearest to the reference pixels in a predetermined direction, the reference pixels positioned in an unavailable area.

Even though there are upper or left pixels adjacent to the current block, the pixels may be determined as unavailable reference pixels depending on the coding mode of a block including the pixels. For example, if the block including the upper pixels adjacent to the current block has been inter-coded and reconstructed, the upper pixels may be determined as unavailable pixels. In this case, available reference pixels may be generated using pixels of an adjacent block that has been intra-coded and reconstructed. The video encoder should transmit information indicating that available reference pixels are determined according to a coding mode to the video decoder.

Subsequently, the intra-prediction mode of the current block is determined using the reference pixels (S140). The number of intra-prediction modes available to the current block may be determined differently based on the size of the current block. For example, if the current block is of size 8×8, 16×16, or 32×32, there may be 34 intra-prediction modes. If the current block is of size 4×4, there may be 17 intra-prediction modes. The 34 or 17 intra-prediction modes may include one or more non-directional modes and a plurality of directional modes. The one or more non-directional modes may be a DC mode and/or a planar mode. If the DC mode and the planar mode correspond to the non-directional modes, there may exist 35 intra-prediction modes irrespective of the size of the current block. In this case, the 35 intra-prediction modes may include 2 non-directional modes (DC mode and planar mode) and 33 directional modes.

In the planar mode, a prediction block of the current block is generated using at least one pixel value at a bottom-right position of the current block (or a prediction value of the pixel value, hereinafter referred to as a first reference value) and reference pixels.

Figure 3:
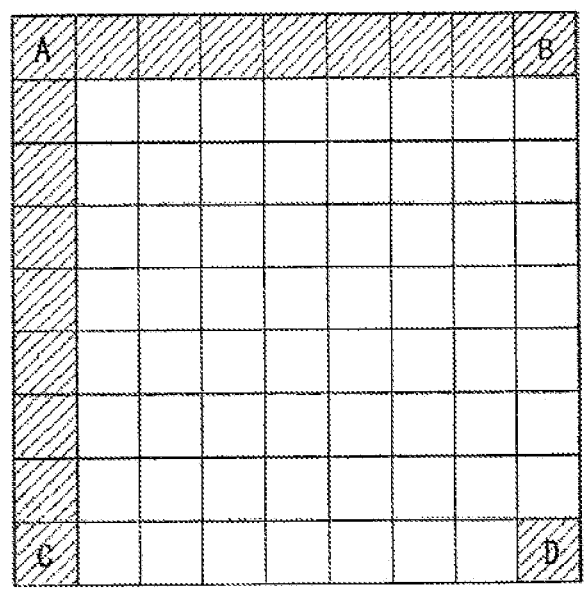
FIG. 3 is a drawing referred to for describing planar mode prediction according to an embodiment of the present invention.

The planar mode will be described below with reference to FIG. 3. FIG. 3 is a drawing referred to for describing planar-mode prediction, when a current block is an 8×8 block.

Referring to FIG. 3, prediction pixels corresponding to pixels between a first reference value D at the bottom-right corner of a current block and a pixel value C adjacent to a pixel at the bottom-left corner of the current block among left pixels adjacent to the current block, are generated using the first reference value D and the pixel value C. Similarly, prediction pixels corresponding to pixels between the first reference value D and a pixel value B adjacent to a pixel at the top-right corner of the current block among upward pixels adjacent to the current block, are generated using the first reference value D and the pixel value B. Linear combination may be used in generating the prediction pixels. If pixels are not arranged linearly, the prediction pixels may be generated through predetermined non-linear combination.

Then, the remaining prediction pixels are generated using the generated prediction pixels (i.e. the pixels between the pixels C and D and the pixels between the pixels B and D) and pixels adjacent to the current block (i.e. pixels between the pixels A and B and pixels between the pixels A and C). These prediction pixels may be generated by linearly combining two adjacent pixels above and to the left of the current block and two adjacent pixels under and to the right of the current block. The combination is not necessarily linear. Rather, non-linear combination may be used, taking into account a pixel distribution. As the above example, in the planar mode, the number of the reference pixels used for generating the prediction pixels may be determined differently based on a position of the prediction pixel.

In the above example, it may occur that left reference pixels of the current block are available but upper reference pixels of the current block are not available. In this case, the upper reference pixels may be generated using the first reference value or one of the left reference pixels. In other words, if only the left reference pixels are available, the upper reference pixels may be generated by copying a top reference pixel of the left reference pixels, and prediction pixels between pixels B and D may be generated by using the first reference value and a reference pixel nearest to the upper pixel.

Likewise, if the upper reference pixels of the current block are available but the left reference pixels are not available, the left reference pixel may be generated by copying the most-left reference pixel of the upper reference pixels, and prediction pixels between pixels C and D may be generated by using the left reference pixel and the first reference value.

Meanwhile, the first reference value or information indicating the first reference value may be transmitted in a bit stream to the video decoder, or the video decoder may derive the first reference value without receiving it or the information.

If the first reference value or the information indicating the first reference value is transmitted to the video decoder, the number of bits to be transmitted may be reduced by transmitting the difference between the first reference value and a prediction value of the reference value calculated using at least one of adjacent pixels of the current block, which have been encoded and reconstructed. For this purpose, the prediction value of the first reference value may be one of (1) the average of reference pixels adjacent to the current block, (2) the average of the pixels A, B and C, and (3) the average between the pixels B and C. Alternatively, the difference between the pixels A and C is compared with the difference between the pixels A and B and the pixel (B or C) representing a direction corresponding to the smaller difference may be determined as the prediction value of the first reference value.

On the other hand, if the first reference value is derived from the video encoder and the video decoder, both the video encoder and the video decoder should be able to derive the same reference value. For this purpose, the video encoder may use the reference pixels A, B and C to generate the first reference value. On the assumption that pixel values within a picture are smoothly changed, one of (1) the sum of the pixel C and the difference between the pixels B and A or the sum of the pixel B and the difference between the pixels C and A, i.e. (B+C−A) and (2) the average between the pixels B and C may be set as the first reference value. In this case, an adjacent reference pixel of the pixel B and an adjacent reference pixel of the pixel C may be used, instead of the pixels B and C. Likewise, since the video encoder and decoder can reconstruct the same first reference value, the video encoder does not need to transmit the first reference value or the information indicating the first reference value to the video decoder, thereby reducing the number of bits to be transmitted.

When the intra-prediction mode of the current block is determined, a prediction block is generated (S150). The prediction block is generated using the reference pixel (including the generated reference pixel) or by linearly combining them based on the intra-prediction mode of the current block. In DC mode, the prediction block of the current block is generated using an average value of adjacent reference pixels to the current block. The adjacent reference pixels may include an available reference pixel and the generated reference pixel.

If the intra-prediction mode of the current block is determined, information indicating the intra-prediction mode is encoded (S160). The intra-prediction mode information may be encoded in the intra-predictor 120, a separately configured intra-prediction mode encoder (not shown), or the entropy encoder 150.

In the case where many reference blocks are adjacent to the current block, there may be a difference between reference pixels at the boundaries of the reference blocks. In this case, residual blocks generated after a prediction block is generated are highly likely to contain many high-frequency components. Therefore, blocking artifact between the reference blocks affects the current block. This problem gets severe as the current block is larger in size. On the other hand, the problem may not occur if the reference blocks are larger than the current block.

Accordingly, one of methods for solving the problem is to generate new reference pixels by adaptively filtering the reference pixels. To generate the new reference pixel may precede the determination of an intra-prediction mode. That is, the new reference pixels may be generated in advance by adaptively filtering the reference pixels based on the intra-prediction mode and the size of the prediction block, and then the intra-prediction mode of the current block may be determined using original reference pixels and the new reference pixels. Alternatively, the method may be performed after the intra-prediction mode of the current block is determined. Since the problem related to the blocking artifact gets severe as a block size is larger, the number of the prediction mode for filtering the reference pixels may be equal to or increased.

If the available reference pixels need to be filtered, two or more filters may be adaptively applied according to the difference between the reference pixels. The filter is preferably low-band pass filter. For example, if two filters are used, first and second filters may corresponds to a 3-tap filter and a 5-tap filter, respectively. The second filter may be implemented by applying the first filter twice. Preferably, the filter coefficients of the filters are symmetrical. Or, only one filter may be used for reducing a complexity.

Preferably, the filter is adaptively used according to the size of the current block (a block for which the intra-prediction will be performed). That is, if the filter is used, it is preferred to apply a filter with a narrow bandwidth when the current block is smaller to a small block and a filter with a broad bandwidth to a large block. However, if the size of the current block is smaller than the number of taps of a filter, the filter is not applied to the current block.

In the DC mode, there is no need for applying a filter because a prediction block is generated using the average value of reference pixels. If a filter is used in the DC mode, a computation volume is unnecessarily increased. In addition, in case of a vertical mode in which an image is correlated vertically, there is no need for applying a filter to the reference pixel. Also, in case of a horizontal mode in which an image is correlated horizontally, there is no need for applying a filter to the reference pixel. Because whether to apply a filter to a current block is associated with the intra-prediction mode of the current block, the reference pixel may be adaptively filtered based on the intra-prediction mode of the current block and a size of a block for which the intra-prediction will be performed. If the size of the block for which the intra-prediction will be performed is smaller than a predetermined size (for example, 4×4), the reference pixel is not filtered. Or, even though the size of the block is larger than the predetermined size, the reference pixel may be not filtered, for reducing a complexity. If the size of the block is included within a range of the predetermined size, when the reference pixel is filtered in any one mode of intra-prediction modes between a diagonal intra-prediction mode (a mode which has a difference of 45° angle from horizontal or vertical mode) and a horizontal intra-prediction mode, the reference pixel is filtered in directional modes between the mode and the diagonal intra-prediction mode.

Another method for solving the above-described problem is to generate a new prediction block by adaptively filtering a portion of pixels within the prediction block that has been generated using the reference pixels. Neighboring prediction pixels adjacent to reference pixels, of prediction pixels within a prediction block, according to the intra-prediction mode of the current block, may be amended using at least one of the reference pixels. This method may also be applied when generating the prediction block.

For example, in case of DC mode, a neighboring prediction pixel adjacent to reference pixels, of prediction pixels within a prediction block, is filtered using a reference pixel adjacent to the neighboring prediction pixel. Accordingly, the prediction pixel is filtered using one or two reference pixels according to a position of the prediction pixel. The filtering of the prediction pixel in the DC mode may be applied for prediction blocks of all sizes.

In case of vertical mode, neighboring prediction pixels adjacent to left reference pixels, of prediction pixels within a prediction block, may be changed using reference pixels except for upper pixels used for generating the prediction block. Likewise, in case of horizontal mode, neighboring prediction pixels adjacent to upper reference pixels, of generated prediction pixels, may be changed using reference pixels except for left pixels used for generating the prediction block.

Meanwhile, a residual block between the current block and the prediction block generated by the intra-predictor 120 is encoded through the transform encoder/quantizer 140 and the entropy encoder 150.

The residual block is first transformed. For effective energy compression, a block size for transforming the residual block is determined and then the residual block is transformed in blocks each of the determined block size. Or the block size for transformation may be determined in advance. In this case, the block size for transformation may be determined as a size of the current block for intra-prediction. A different transformation scheme may be used according to an intra-prediction mode. For example, integer-based DCT (Discrete Cosine Transform), in horizontal and vertical direction, may be applied to a residual block intra-predicted in the DC mode and integer-based DST (Discrete Sine Transform), in horizontal and vertical direction, may be applied to a residual block intra-predicted in the planar mode. It may be applied to a block which has a size being equal to or smaller than a predetermined size. But, in case of a block for transformation which has a size being larger than the predetermined size, the only integer-based DCT may be applied, irrespective of the intra-prediction mode. DCT or DST, in horizontal and vertical direction, may be adaptively used according to a prediction mode.

The transformed residual block is quantized. A different quantization matrix is used according to a size of the residual block. Also, for residual blocks of the same size, different quantization matrices may be used. That is, the more effective quantization matrix of at least two quantization matrices may be used based on the coefficient distribution of the transformed residual block. In this case, information indicating the used quantization matrix may be transmitted to the video decoder. In addition, a different quantization matrix may be applied to the transformed residual block, based on an intra-prediction mode.

Then, the two-dimensional quantized coefficients are converted to a sequence of one-dimensional quantized coefficients using one of a plurality of predetermined scan patterns and then entropy-encoded. The scan pattern may be determined based on the intra-prediction mode, or based on the intra-prediction mode and the block size for the transformation.

Figure 4:
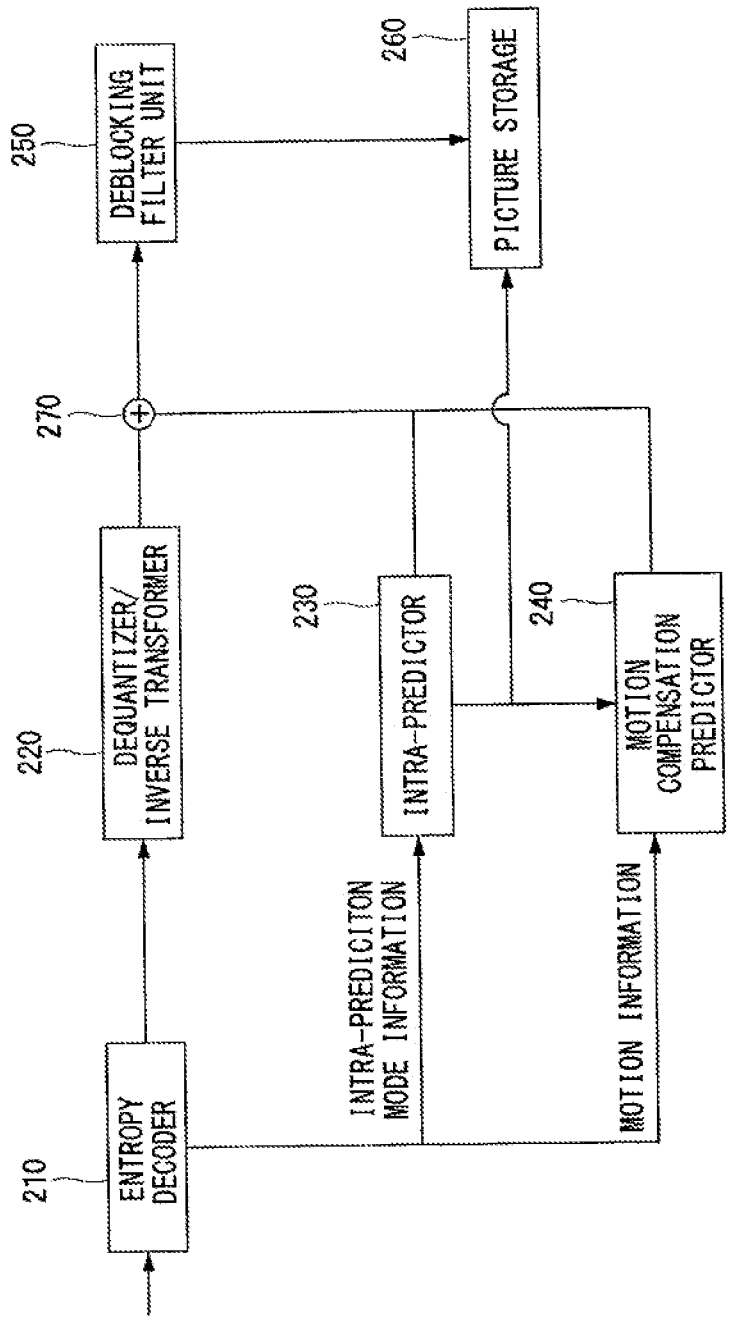
FIG. 4 is a block diagram of a video decoder according to an embodiment of the present invention.

FIG. 4 is a block diagram of a video decoder according to an embodiment of the present invention.

Referring to FIG. 4, the video decoder of the present invention includes an entropy decoder 210, a dequantizer/inverse transformer 220, an intra-predictor 230, a motion compensation predictor 240, a deblocking filter 250, a picture storage 260, an adder 270, and an intra/inter switch 280.

The entropy decoder 210 separates a coded bit stream received from the video encoder into an intra-prediction mode index, motion information, and a quantized coefficient sequence by decoding the coded bit stream and provides the decoded motion information to the motion compensation predictor 240, the intra-prediction mode index to the intra-predictor 230 and the dequantizer/inverse transformer 220, and the quantized coefficient sequence to the dequantizer/inverse transformer 220.

The dequantizer/inverse transformer 220 converts the quantized coefficient sequence to a two-dimensional array of dequantized coefficients. For the conversion, one of a plurality of scan patterns is selected. One of the plurality of scan patterns is selected based on the prediction mode (i.e. one of intra-prediction and inter-prediction) of the current block, intra-prediction mode and a block size for transformation. The intra-prediction mode is received from the intra-predictor 230 or the entropy decoder 210.

The dequantizer/inverse transformer 220 reconstructs quantized coefficients from the two-dimensional array of dequantized coefficients using a quantization matrix selected from among a plurality of quantization matrices. The quantization matrix may be determined using information received from an encoder. A different quantization matrix may be used according to a size of the current block (block for transformation) to be reconstructed. Even for blocks of the same size, the dequantizer/inverse transformer 220 may select a quantization matrix based on at least one of the prediction mode of the current block and the intra-prediction mode. Then a residual block is reconstructed by inversely transforming the reconstructed quantized coefficients.

The adder 270 adds the reconstructed residual block received from the dequantizer/inverse transformer 220 to a prediction block generated from the intra-predictor 230 or the motion compensation predictor 240, thereby reconstructing an image block.

The deblocking filter 250 performs a deblocking filtering for the reconstructed image obtained by the adder 270. Thus, deblocking artifact caused by image loss during quantization may be reduced.

The picture storage 260 is a frame memory that preserves a local decoded image that has been deblocking-filtered by the deblocking filter 250.

The intra-predictor 230 decodes the intra-prediction mode of the current block based on the intra-prediction mode index received from the entropy decoder 210 and generates a prediction block according to the decoded intra-prediction mode.

The motion compensation predictor 240 generates a prediction block of the current block from a picture stored in the picture storage 260 based on the motion vector information. If the motion compensation with a fractional-pixel accuracy is applied, the prediction block is generated using a selected interpolation filter.

The intra/inter switch 280 provides the prediction block generated from one of the intra-predictor 230 and the motion compensation predictor 260 to the adder 270.

Figure 5:
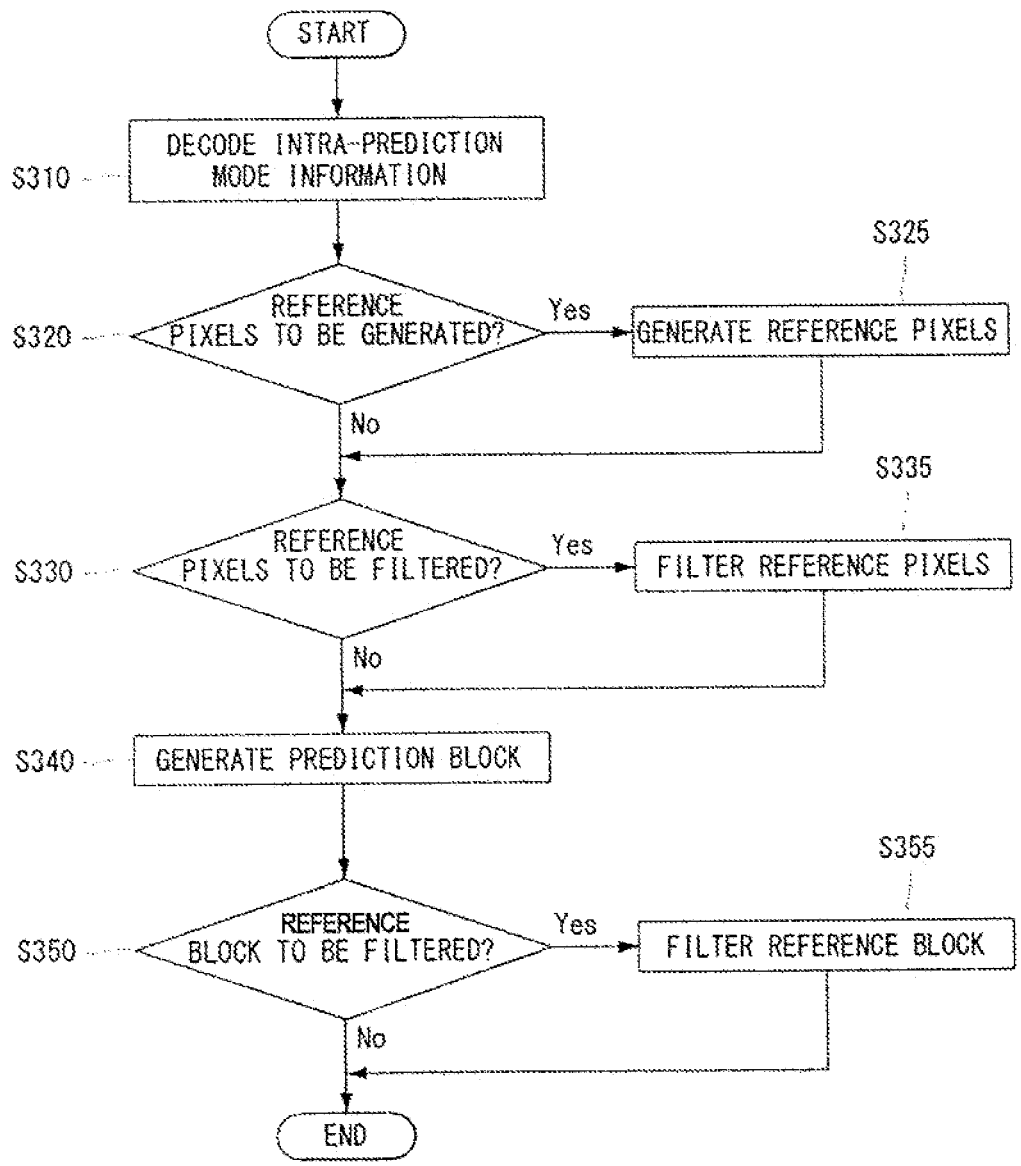
FIG. 5 is a flowchart illustrating an operation for reconstructing an intra-block according to an embodiment of the present invention.

Now a description will be given of an operation for reconstructing a current block through intra-prediction with reference to FIG. 4. FIG. 5 is a flowchart illustrating an operation for reconstructing an intra-block according to an embodiment of the present invention.

The intra-prediction mode of a current block is decoded from a received bit stream (S310).

For this purpose, the entropy decoder 210 reconstructs a first intra-prediction mode index referring to one of a plurality of tables related to intra-prediction mode.

The plurality of tables related to the intra-prediction mode are shared between the video encoder and the video decoder. One of the tables related to the intra-prediction mode may be selected according to the distribution of the intra-prediction modes of a plurality of blocks adjacent to the current block. For example, if the intra-prediction mode of a left block adjacent to the current block is identical to that of an upper block adjacent to the current block, the first intra-prediction mode index of the current block may be reconstructed using a first intra-prediction mode table. If the intra-prediction modes of the left and upper adjacent blocks are different, the first intra-prediction mode index of the current block may be reconstructed using a second intra-prediction mode table. In another example, in the case where the intra-prediction modes of both the left and upper adjacent blocks are directional intra-prediction modes, if the directions of the intra-prediction modes are within a predetermined angle, the first intra-prediction mode index of the current block may be decoded using the first intra-prediction mode table. If the directions of the intra-prediction modes are outside the predetermined angle, the first intra-prediction mode index of the current block may be decoded using the second intra-prediction mode table.

The entropy decoder 210 transmits the decoded first intra-prediction mode index of the current block to the intra-predictor 230. If the first intra-prediction mode index is a minimum value (i.e. 0), the intra-predictor 230 determines a maximum mode available for the current block to be the intra-prediction mode of the current block. On the other hand, if the first intra-prediction mode index is non-zero, the intra-predictor 230 compares a maximum mode index indicating the maximum mode with the first intra-prediction mode index of the current block. If the first intra-prediction mode index is equal to or larger than the maximum mode index, the intra-predictor 230 determines an intra-prediction mode corresponding to a second intra-prediction mode index, which has a value of the first intra-prediction mode index plus 1, to be the intra-prediction mode of the current block. Otherwise, the intra-predictor 230 determines an intra-prediction mode corresponding to the first intra-prediction mode index to be the intra-prediction mode of the current block.

The intra-prediction mode available to the current block may include one or more non-directional mode and a plurality of directional modes. The one or more non-directional mode may be a DC mode and/or a planar mode. One of the DC mode and the planar mode may be included adaptively in an available intra-prediction mode set. Thus, information indicating a non-directional mode included in the available intra-prediction mode set may be included in a picture header or a slice header.

Subsequently, the intra-predictor 230 reads reference pixels from the picture storage 260 to generate an intra-prediction block and determines whether there exists an unavailable reference pixel (S320). The determination may be made based on whether there are reference pixels needed for generating an intra-prediction block according to the intra-prediction mode of the current block.

If it is necessary to generate reference pixels, the intra-predictor 230 may generate reference pixels on unavailable position using decoded reference pixels (S325). The definition of the unavailable reference pixels and the methods for generating reference pixels have been described in relation to the operation of the intra-predictor 120 illustrated in FIG. 2. Only reference pixels required to generate an intra-prediction block according to the intra-prediction mode of the current block may be selectively reconstructed.

The intra-predictor 230 determines whether to filter reference pixels to generate the prediction block (S330). That is, the intra-predictor 230 determines whether to perform a filtering for reference pixels, based on the intra-prediction mode and the size of the current block, to generate the intra-prediction block of the current block. Since the problem about blocking artifact gets severe as the current block is larger in size, the number of prediction mode for filtering a reference pixel can be increased as the current block is larger in size. However, the reference pixel may not be filtered for decreasing the complexity, since the block may be considered as an area in which pixels are smoothly changed when the block is larger than a predetermined value in size.

If determining to filter the reference pixels, the intra-predictor 230 filters the reference pixels using a filter (S335).

If the valid reference pixels need to be filtered, it can adaptively apply at least two filters based on a difference of pixel values between the reference pixels. Preferably, the filter coefficients of the filters are symmetrical.

Preferably, the two or more filters may be adaptively used based on the size of the current block. That is, when filters are used, it can apply a filter with a narrow bandwidth to a small block and a filter with a broad bandwidth to a large block.

In the DC mode, there is no need for applying a filter in the DC mode because a prediction block is generated using the average of reference pixels. That is, the amount of calculation may be increased unnecessarily if the filter is applied. In addition, in case of a vertical mode having a correlation vertically, the filter may not be needed to apply for reference pixels. And, in case of a horizontal mode having a correlation horizontally, the filter may not be needed to apply for reference pixels. Because whether to apply a filter to a current block is related to the intra-prediction mode of the current block, adaptive filtering may be performed based on the intra-prediction mode of the current block and a block size of the prediction block.

Subsequently, a prediction block is generated using the reference pixels or the filtered reference pixels according to the determined intra-prediction mode (S340).

The generating method of the prediction block is omitted because the operation of the encoder in FIG. 2 is similar to that. And, in case of the planar mode, the generating method of the prediction block is also omitted because the operation of the encoder in FIG. 2 is similar to that. It is determined whether the generated prediction block is to be filtered (S350). The determination may be made based on information included in a slice header or a CU header. Also, the determination may be made based on the intra-prediction mode of the current block.

When it is determined to filter the generated prediction block, the generated prediction block is filtered (S335). Specifically, a new pixel is generated by filtering a pixel at a specific position in the prediction block that has been generated using available reference pixels adjacent to the current block. This method may also be applied when generating the prediction block. For example, prediction pixels adjacent to reference pixels in DC mode may be filtered using the reference pixels. Accordingly, the prediction pixels may be filtered using one or two reference pixels based on a position of the prediction pixel. The filtering of prediction pixels in the DC mode may be applied for all sizes of a prediction block. In case of vertical mode, neighboring prediction pixels adjacent to left reference pixels, of prediction pixels within a prediction block, may be changed using reference pixels except for upper pixels used for generating the prediction block. Likewise, in case of horizontal mode, neighboring prediction pixels adjacent to upper reference pixels, of generated prediction pixels, may be changed using reference pixels except for left pixels used for generating the prediction block.

The current block is reconstructed using the reconstructed prediction block of the current block and the decoded residual block of the current block.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for encoding an image, the method comprising:
    determining an intra prediction mode of a current block;
    generating a prediction block of the current block according to the intra prediction mode;
    generating a residual block by calculating a difference between the current block and the prediction block;
    transforming the residual block to generate a transform block;
    quantizing the transform block to generate a quantized block; and
    entropy-coding coefficients of the quantized block,
    wherein the generating the prediction block of the current block according to the intra prediction mode includes:
    generating reference pixels on an unavailable position if there exist unavailable reference pixels of the current block;
    determining whether reference pixels of the current block are filtered or not based on the intra prediction mode and a block size of the current block; and
    filtering the reference pixels of the current block using a filter if it is determined that the reference pixels of the current block are filtered,
    wherein the reference pixels are adaptively filtered based on the block size of the current block,
    wherein the filter is not applied if it is determined that the size of the current block is smaller than a first size,
    wherein if a number of intra prediction modes to which the filter is applied is increased, it is determined that the size of the current block is larger than the first size and smaller than a second size, and
    wherein the reference pixels of the current block are not filtered in a DC mode because the prediction block is generated using an average of the reference pixels.

2. The method of claim 1, wherein the intra prediction mode is selected among a predetermined number of directional intra prediction modes and two non-directional intra prediction modes.

3. The method of claim 1, wherein the number of the intra prediction modes for filtering the reference pixels increases as the current block becomes larger.

4. A non-transitory recording medium which includes a bit stream decoded by an image decoding device, the bit stream being generated by dividing an image into a plurality of blocks and by performing intra prediction for a corresponding block and including:
    information indicating an intra prediction mode group indicator and a prediction mode index of a current prediction block, and
    information indicating one-dimensional (1D) quantized transform coefficients generated by scanning quantized transform coefficients of a quantized transform block,
    wherein the image decoding device:
    restores the intra prediction mode group indicator and the prediction mode index of the current prediction block and the 1D quantized transform coefficients from the bit stream, generates the quantized transform block by inversely scanning the 1D quantized transform coefficients,
    generates a transform block by inversely quantizing the quantized transform block,
    generates a residual block by inversely transforming the transform block,
    generates a prediction block of the current prediction block according to an intra prediction mode, and
    generates an original block by adding the prediction block and the residual block,
    wherein the image decoding device generates the prediction block by performing:
    generating reference pixels on an unavailable position if there exist unavailable reference pixels of the current block;
    determining whether reference pixels of the current block are filtered or not based on the intra prediction mode and a block size of the current block; and filtering the reference pixels of the current block using a filter if it is determined that the reference pixels of the current block are filtered, wherein the reference pixels are adaptively filtered based on the block size of the current block, wherein the filter is not applied if it is determined that the size of the current block is smaller than a first size, wherein if a number of intra prediction modes to which the filter is applied is increased, it is determined that the size of the current block is larger than the first size and smaller than a second size, and wherein the reference pixels of the current block are not filtered in a DC mode because the prediction block is generated using an average of the reference pixels.

* * * * *